United States Patent [19]

Fogle et al.

[11] 4,152,313

[45] May 1, 1979

[54] VINYL FILM-WOOD LAMINATES AND ADHESIVE THEREFOR

[75] Inventors: Ozzie Fogle; James Cooley; Michael E. Taylor, all of Orangeburg, S.C.

[73] Assignee: Champion International Corporation, Stamford, Conn.

[21] Appl. No.: 852,343

[22] Filed: Nov. 17, 1977

[51] Int. Cl.$^2$ ............................................. C08L 31/04
[52] U.S. Cl. ................. 260/29.6 MH; 260/29.6 MN; 428/514
[58] Field of Search .............. 260/29.6 MH, 29.6 MN

[56] References Cited

U.S. PATENT DOCUMENTS

| | | | |
|---|---|---|---|
| 2,918,443 | 12/1959 | Roeser | 260/30.2 |
| 3,347,811 | 10/1967 | Bissot | 260/29.6 MN |
| 3,549,589 | 12/1970 | Meincke | 260/2.5 AK |
| 3,734,819 | 5/1973 | Knutson | 260/29.6 WA |

Primary Examiner—M. J. Welsh
Attorney, Agent, or Firm—Evelyn M. Sommer

[57] ABSTRACT

A vinyl film-wood product substrate laminate is formed using as an adhesive a mixture of a vinyl acetate-ethylene emulsion and an admixture of toluene and N-lower alkyl substituted pyrrolidone.

5 Claims, No Drawings

VINYL FILM-WOOD LAMINATES AND ADHESIVE THEREFOR

BACKGROUND OF THE INVENTION

The development of satisfactory adhesives for use in connection with vinyl plastics has attracted considerable attention over the years. Many common adhesives possess some desirable properties but are lacking in others. For example, the proteinaceous materials are characterized by good adhesion but are highly susceptible to water. Solutions of polyacrylates are flammable and toxic and cause swelling or solvation of the plastic.

Vinyl acetate-ethylene emulsion adhesives for use in connection with vinyl surfaces have been developed as exemplified by Knutson U.S. Pat. No. 3,734,819, Meincke U.S. Pat. No. 3,549,589 and Bissot U.S. Pat. No. 3,347,811. The emulsion adhesives, however, still exhibit inadequate bond performance for many commercial applications and particularly for use in connection with vinyl film-wood product laminates such as those formed in a continuous hot line heated reactivated laminating process.

Roeser U.S. Pat. No. 2,918,443 discloses that a combination of an N-aliphatic hydrocarbon substituted derivative of 2-pyrrolidone and a liquid aromatic hydrocarbon is an effective solvent for copolymers of vinyl chloride and vinyl acetate and that the resulting solution is useful as an adhesive.

It is the object of this invention to provide a new adhesive formulation for use in preparing vinyl film-product substrate laminates which provides a superior bond performance and to provide satisfactorily bonded vinyl film-wood product substrate laminates. These and other objects of the invention will become apparent to those skilled in the art from the following description of the invention.

SUMMARY OF THE INVENTION

This invention relates to an adhesive for preparing a vinyl film-wood product substrate laminate and to the resulting product. The adhesive contains a major amount of a vinyl acetate-ethylene emulsion and a minor amount of a blend of toluene and N-lower alkyl substituted pyrrolidone.

DESCRIPTION OF THE INVENTION

The vinyl plastic films which are employed in the present invention include polyvinyl chloride, polyvinyl fluoride, polyvinyl formal, polyvinylidene chloride, polyvinyl butyral and the like. The preferred vinyl plastic is polyvinyl chloride.

The wood product substrate can be selected from such diverse materials as plywood, composition boards such as particle board, chipboard, and the like, lauan, hardboard, etc.

The vinyl plastic film and wood product substrate are bonded together by an adhesive formulation which contains a major amount of a vinyl acetate-ethylene emulsion and a minor amount of a blend of toluene and N-lower alkyl substituted pyrrolidone. In general, the adhesive contains about 85–95 weight percent of the emulsion and correspondingly about 15–5% of the blend, and preferably contains about 90% of the emulsion and 10% of the blend.

The vinyl acetate-ethylene emulsions are known materials and are generally aqueous emulsions of the copolymer in which the vinyl acetate constitutes the major copolymerized monomer. The copolymer usually contains 75–90 weight percent vinyl acetate and can also contain small amounts of other copolymerized material such as acrylic acid or a sulfonic comonomer. The emulsion can contain minor amounts of protective colloids such as casein, various natural gums, polyvinyl alcohol, and the like, emulsifying agents, plasticizers such as phthalate esters, glycol derivatives, esters of adipic, sebacic, abietic and ricinoleic acids, toluene sulfonic acid derivatives, and the like, fillers and pigments.

The solids content of the emulsion is adjusted such that the resulting viscosity is appropriate for ease of coating and the solids content is usually between about 25 and 75 percent and preferably about 35 to 65 weight percent.

The other component of the adhesive formulation is a blend of toluene and an N-lower alkyl substituted pyrrolidone. Lower alkyl encompasses 1 to 4 carbon atoms and the preferred alkyl moiety is ethyl. The blend can be prepared in any convenient manner using 1 to about 2 parts of one component per part of the other component, i.e., in a weight ratio of about 2:1 to 1:2. Preferably, the two components are combined in substantially equal weight amounts.

The adhesive composition is applied to the wood or wood product substrate by conventional techniques such as spraying, doctoring, rolling, brushing, and the like. In general, the adhesive is applied to provide a wet thickness of about 1 to 5 mils, and preferably about 2 to 3 mils. Thereafter the vinyl film is laminated to the adhesive at elevated temperature and under pressure. The lamination temperature can be about 200°–300° F., preferably about 240°–260° F. and pressures of about 8 to 40 Kg/Lcm, preferably about 12 to 25 Kg/Lcm are employed.

In a particularly preferred embodiment, the laminate is formed in a continuous hot line heat reactivated laminating process. In such a process, the wood substrate is continuously conveyed through several zones of a coating and laminating line. In the first zone, about one-half of the desired amount of adhesive is direct roller coated onto the substrate and in the second zone the substrate is subjected to an elevated temperature of between 100° and 350° F. for a short period of time to dry but not cure the first adhesive coat. The coating and drying steps are then repeated in a third and fourth zone and thereafter the coated substrate is heated to a surface temperature sufficient to reactivate the adhesive, the vinyl film is applied and the composite is passed through rollers at an elevated temperature to effect the lamination.

If desired, the vinyl film can be top coated with an ultraviolet curable alkyd urea topcoat or water borne coating.

As one specific example of the instant invention, an adhesive was prepared from 10 parts of a 50:50 blend of toluene and N-methyl pyrrolidone and 100 parts of a vinyl acetate-ethylene copolymer emulsion having a solids content of about 45%. The vinyl acetate constituted about 20% of the copolymer. A lauan substrate was continuously conveyed through several zones in a coating and laminating line. In the first zone, the adhesive composition was direct roller coated on the lauan substrate at an application rate of 1 to 1.5 wet mils thickness. The second zone was a 30 foot long oven maintained at a temperature of 100°–350° F. and the coated substrate was conveyed therethrough at a speed of 120 ft. per minute to dry the first adhesive coat. In the third zone, the coated substrate was direct roller coated with an additional 1 to 1.5 wet mil thick coating of the adhesive and the fourth zone was a 40 foot long oven maintained at 100°–350° F. through which the coated substrate was conveyed at a speed of 120 feet per minute. In the next zone, the substrate with the dried adhesive coating was heated to a surface temperature of about 250° F. in order to reactivate the adhesive. A 2 mil thick polyvinyl chloride film was applied and the resulting composite was then passed under a rubber roll maintained at 250° F. in order to provide a laminated composite about 150 mils thick.

The resulting board had a peel test rating of 7–8#/linear inch while the peel test rating of the composite without the instant blend amounted to 2#/linear inch.

Various changes and modifications can be made in the products and process of this invention without departing from the spirit and scope thereof. The various embodiments disclosed herein were set forth for the purpose of further illustrating the invention but were not intended to limit it.

What is claimed is:

1. An adhesive composition comprising about 85–95% of a vinyl acetate-ethylene copolymer emulsion and about 5–15% of an admixture of toluene and N-lower alkyl substituted pyrrolidone, the weight ratio of toluene to pyrrolidone being about 2:1 to 1:2.

2. The adhesive composition of claim 1 wherein said lower alkyl group is methyl.

3. The adhesive composition of claim 1 wherein said emulsion is about 90% and said admixture is about 10%.

4. The adhesive composition of claim 3 wherein said weight ratio of toluene to pyrrolidone is about 1:1.

5. The adhesive composition of claim 4 wherein said pyrrolidone is N-methyl pyrrolidone.

* * * * *